Figure 1:
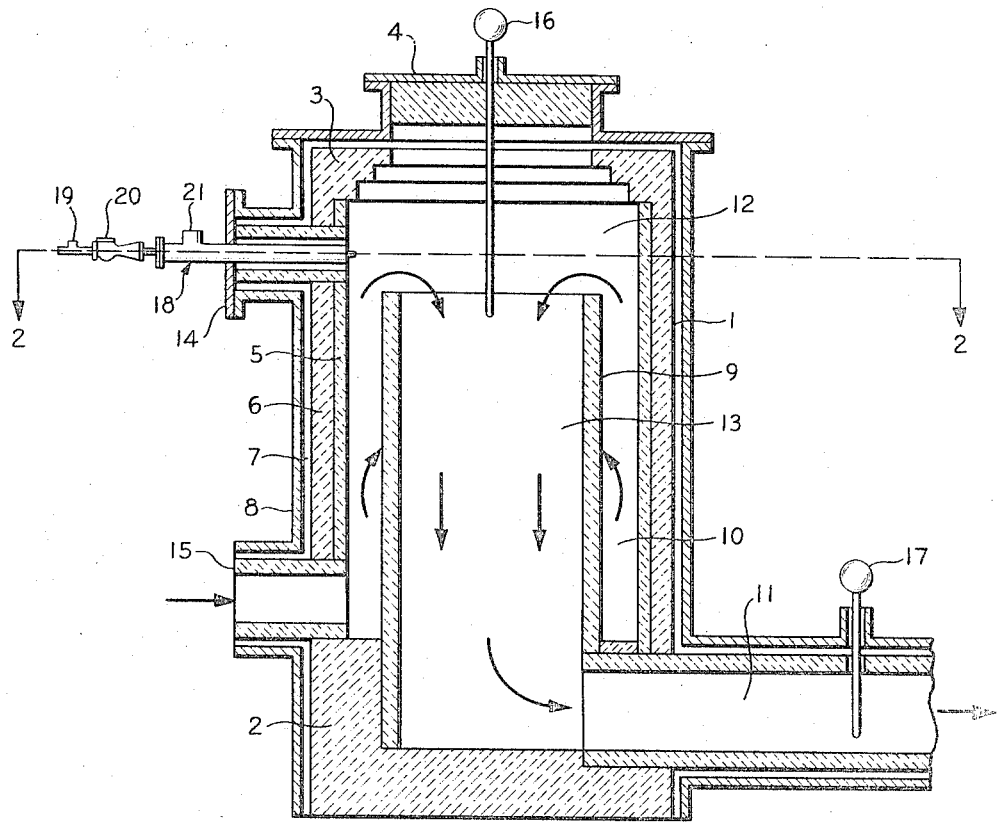

3,305,309
PRODUCTION AND RECOVERY OF HYDROGEN
HALIDES
Richard G. Woodland, Niagara Falls, and Myron C. Hall, Buffalo, N.Y., assignors to Hooker Chemical Corporation, Niagara Falls, N.Y., a corporation of New York
Filed Mar. 25, 1963, Ser. No. 267,679
7 Claims. (Cl. 23—155)

This invention relates to an improved process and apparatus capable of converting halogenated organic residue materials to hydrogen halide recoverable as a salable product and more particularly it relates to improvements in that portion of the process and apparatus concerned with the handling of the halogenated organic residue materials prior to the time they are converted to the hydrogen halide.

Halogenated organic residues from halogenation processes, and in particular chlorination and bromination processes, such as the residues obtained from the processes for manufacturing materials such as hexachlorocyclopentadiene, benzoyl chloride, benzyl chloride, chlorendic acid, and the like, have in the past presented a difficult disposal problem. These halobenated organic residues are toxic to plant and animal matter so that they generally cannot be released into rivers or lakes, nor can they be dumped on land where the drainage therefrom will reach waters used for human consumption. Attempts to dispose of these halogenated materials by burning, using conventional furnace apparatus, have generally not been satisfactory, principally because the large amount of halogenated material in these residues made them difficultly combustible or resulted in a combustion gas having an appreciable free halogen content which corroded the equipment used and contaminated the surrounding atmospheree. Moreover, in such a disposal process, recovery of the free halogen from the combustion gases, in a salable form, is virtually impossible so that the halogen content of the residue materials being treated was lost.

In an effort to overcome the above difficulties, a process was developed involving the use of a self-regenerative furnace wherein these halogenated organic residue materials are converted into a hydrogen halide product containing substantially no free carbon or halogen and organics. Moreover, in this process, the furnace operates continuously, thus not requiring intermittent shutdowns to regenerate the needed heat of ignition, and additionally, generally does not require auxiliary fuel during the disposal operation, thereby reducing the disposal cost. This process and apparatus is the subject of a copending application, Serial Number 814,700, filed May 21, 1959.

Although the use of this process and apparatus has been generally effective in overcoming the difficulties which have heretofore been encountered in disposing of these halogenated organic residues, some difficulties have been encountered, particularly in introducing the residue material into the reactor or furnace. It has been found that an appreciable amount of the residue builds up on the relatively cool bottom portion of the furnace, without being burned, forming appreciable deposits of coke and tars. In order to dispose of this material, it has been necessary to discontinue the normal furnace operation and insert auxiliary gas burners. This is costly both in terms of the fuel gas consumed as well as the loss of furnace capacity during the burning operation. Moreover, it has been found that these coke and tars have a detrimental effect on the furnace refractory, causing serious disintegration of this material. Attempts to overcome this problem by the use of nozzles and/or pressure injection of the residue into the furnace have not been successful due to the viscous nature of the halogenated organic residues being treated.

It is, therefore, an object of the present invention to provide an improved method for introducing halogenated organic residue materials into a furnace of the self-regenerative type whereby substantially complete conversion of these residues into a hydrogen halide product is obtained with no appreciable build up of unburned or partially burned residue in the furnace.

Another object of the present invention is to provide an improved apparatus whereby the introduction of the halogenated organic residue materials into a furnace of the self-regenerative type in a substantially completely combustible form is achieved.

These and other objects of the present invention will become apparent from the description of the invention which follows.

Figure 2:
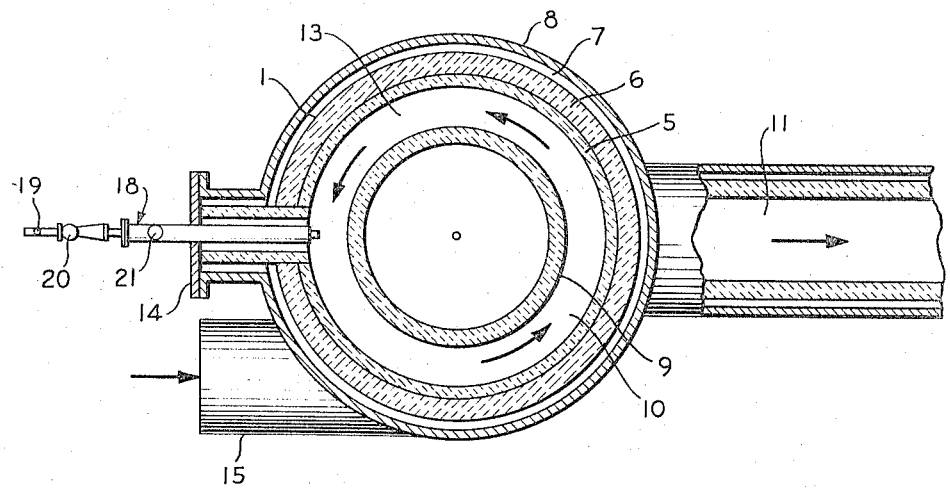
Figure 3:
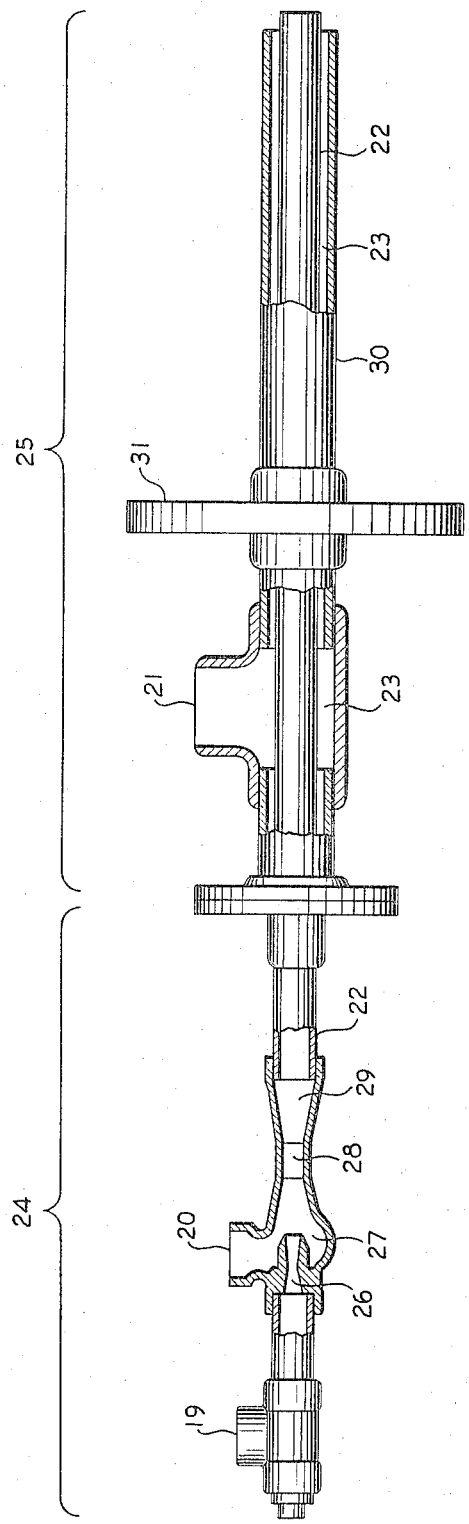

In the drawings which are attached hereto and form a part hereof, FIGURE 1 is a vertical cross section of a self-regenerative type furnace embodying the apparatus of the present invention; FIGURE 2 is a top section of the apparatus shown in FIGURE 1; and FIGURE 3 is an enlarged view of the mixer-nozzle apparatus of the present invention.

Pursuant to the above objects, the method of the present invention involves intimately admixing a halogenated organic material and a gaseous medium selected from the group consisting of gaseous oxygen sources and gaseous hydrogen sources, passing the resulting mixture, under pressure, through a constricted zone into an expanded zone, effecting atomization of the mixture as it passes into the expanded zone, and introducing the resulting atomized mixture into a combustion zone, maintained under conditions to effect substantially complete conversion of the mixture to a product comprising carbon dioxide and hydrogen halide and containing substantially no free halogen, free carbon, and organic compounds. By operating in accordance with this procedure, it is found that not only is a hydrogen halide product recovered in a substantially salable form, but, addtionally, there is no build up of unburned or partially burned halogenated organic materials in the combustion chamber. Accordingly, the difficulties of the prior art processes are overcome.

The materials or residues which may be treated in accordance with the method of the present invention include those highly halogenated organic materials which are normally difficult or impossible to decompose completely in ordinary waste disposal incinerators. Exemplary of such residues which may be treated are hexachlorocyclopentadiene, hexachlorobutadiene, octachlorocyclopentene, heptachlorocyclopentene, benzene hexachloride, the trichlorobenzenes, the tetrachlorobenzenes, the tricholophenols, pentachlorophenol, monochlorotoluene, monochlorobenzyl chloride, chlorobenzoyl, chlorides, chlorinated aliphatic acids, sulfur-containing chlorinated organics, such as the chlorinated thiophenes and thiophene oxides, chlorinated lower aliphatics, such as carbon tetrachloride, chloroform, trichloroethylene, perchloroethylene, hexachloroethane, tetrachloroethane, and the like, as well as the fluorinated, brominated, and iodinated analogs of the above. In general, the only requirement of these materials is that they are obtainable in a sufficiently fluid form as to be pumpable.

The gaseous medium with which the above materials are intimately admixed may be any of those materials which will provide a source of hydrogen and/or a source of oxygen sufficient to supply the hydrogen and oxygen requirements for converting the halogenated organic materials to the hydrogen halides in the combustion zone. Exemplary of hydrogen sources which may be used are steam, hydrogen gas, hydrocarbon gases, and mixtures thereof. Exemplary of suitable oxygen sources are steam, air, oxygen, mixtures thereof, and the like. Of these, and particularly as a source of hydrogen, steam is preferred. This preference is based not only on the low cost and ready availability of steam but also on the fact that the steam adds heat to the halogenated organic material thus helping to bring them up to combustion temperature so that they may be converted to the desired hydrogen halide products in the combustion zone. Accordingly, hereinafter specific reference will be made to steam as the gaseous medium used. This is not, however, to be taken as a limitation on the method of the present invention but merely as being exemplary of this method.

More specifically in the practice of the present invention, any convenient means may be utilized to effect the intimate admixture of the halogenated organic material and the steam. For example, the halogenated organic material may be added or injected into a stream or jet of the steam. Alternatively, the steam may be passed through a nozzle or orifice into a body of the halogenated organic material. As a further alternative, the halogenated organic material may be admixed with the steam in a cyclone type of apparatus. Preferably, however, the intimate admixture of the steam and the halogenated organic material is effected by passing the steam, under pressure, through a restricted zone into an expanded zone. The halogenated organic material is introduced into the expanded zone, and therein, brought into contact with the steam. The intimate admixture of the steam and the helogenated organic material is accomplished by the expanding force of the steam as it leaves the constricted zone and rapidly expands into the expanding zone. In this manner, an easy and economical means for admixing the steam and the halogenated organic materials is provided, which means does not necessitate the use of equipment which may easily be damaged by the temperatures and corrosive conditions under which the operation is carried out and wherein the admixing is carried out without the necessity for large excesses of steam.

Once the admixture of the steam and the halogenated organic material is effected, the mixture is passed through a constricted zone into an expanded zone and atomization of the mixture as it passes into the expanded zone is effected. This atomization of the mixture of steam and halogenated organic material is caused by the expansive force of the mixture as it expands from the constricted zone into the expanded zone. Thereafter, the atomized mixture is introduced into a combustion zone wherein a substantially complete conversion of the mixture to a product comprising carbon dioxide and a hydrogen halide is effected.

It will be appreciated that in addition to the gaseous medium which is admixed with the halogenated organic material and thereafter atomized for injection to the combustion zone, the atomized mixture may be contacted with a second gaseous medium as it is added to the combustion zone. This second gaseous medium is desirably either a gaseous oxygen source or a gaseous source and, preferably, of the type different from that which is intimately admixed with the halogenated organic material. For example, where steam is the gaseous medium which is intimately admixed with the halogenated organic material and formed into the atomized mixture, it is preferred that air or oxygen be used as the gaseous medium for contacting this atomized mixture as it is added to the combustion zone. In this maner, sufficient hydrogen and oxygen are provided with the halogenated organic material to meet the requirements for converting this material in the combustion zone to the desired hydrogen halide product. The contact between the atomized mixture and the second gaseous medium may be accomplished in any convenient manner. Preferably, however, the atomized mixture is enveloped in the gaseous medium as it is injected into the combustion zone.

The amount of the hydrogen source used in the present process will depend upon the amount of burnable hydrogen present in the halogenated organic material. Similarly, the amount of oxygen source used will depend upon the carbon content of the halogenated organic material. In general, the minimum amount of steam added will be at least that amount necessary to convert the halogen content of the halogenated organic materials to the hydrogen halide, and provide a sufficient amount of steam to effect atomization of the halogenated organic material. Although the maximum amount of steam used has not been found to be critical, obviously, large excesses of steam over the amounts theoretically required will not be used inasmuch as these excess amounts of steam which have to be handled will add to the processing cost. Insofar as the minimum amount of oxygen source used, this will be at least that amount necessary to provide sufficient oxygen to react with all of the carbon in the halogenated organic material to form carbon dioxide. The maximum amount of oxygen source which can be used will be that amount which does not unduly cool the combustion zone.

As has been indicated hereinabove, the steam is under pressure as it is admixed with the halogenated organic material. The amount of pressure utilized will, of course, be governed by the pressure required to effect the intimate admixture of the steam with the halogenated organic material and the subsequent atomization of this mixture. Although there has not been found to be any critical maximum amount of steam pressure which may be used, other than the maximum imposed by the materials of which the apparatus used is constructed, for practical consideration, steam pressures in excess of about 100 pounds per square inch (gauge) will generally not be used. Generally, it has been found that excellent results are obtained when using steam pressures within the range of about 30 to about 70 pounds per square inch (gauge), and for this reason, these amounts of steam pressure are preferred. Lower steam pressures, such as 10 p.s.i.g., as well as higher steam pressures, such as 400–500 p.s.i.g., may also be used if desired, the above preferred steam pressures merely being exemplary of those which may be used.

Considering now the drawings, in FIGURE 1, the furnace is shown as having an outer cylindrical fire wall 1, vertically positioned on a foundation 2 at the bottom and covered at the top with refractory brick 3 and an insulated manhole cover 4 which serves as an explosion release means. The outer fire wall 1 is formed with a refractory material 5 on the inside, which has a low heat conductivity and which is resistant to free halogen, oxygen, and hydrogen halide, such as mullite, a composition of aluminum silicate. The refractory material is backed by fire brick 6 and an air gap 7 separates the fire brick from a gas-tight steel shell 8.

The furnace has an inner cylindrical fire wall 9 concentrically aligned with the outer fire wall 1 so that an annular space 10 is formed between the inner and outer walls. The inner fire wall 9 is positioned on the foundation 2 and is in communication at the bottom with an insulated outlet 11. This inner fire wall is in open communication with the top inner space 12 of the outer fire wall 1. Preferably, the inner fire wall 9 is constructed of heat conductive refractory material, such as silicon carbide brick, so that there is an exchange of heat from the inside 13 of the inner wall cylinder through the refractory material to the annular space 10 between the inner and outer fire walls.

A feed inlet 14 is positioned in the outer fire wall 1. While this inlet may be intermediate the top and bottom of the inner fire wall 9 and formed at a downward angle and tangential to the cylindrical outer fire wall 1, it is preferably positioned horizontally above the inner fire wall 9 and is radial with respect to the outer fire wall 1. A second inlet 15 is positioned in the outer wall 1, preferably adjacent the bottom of the annular space 10 between the inner and outer walls. This inlet 15 is preferably located below the first inlet 14 and is tangential to the annular space 10. Additionally, temperature indicating means 16 and 17 are positioned in the top inner space 12 of the outer wall 1 and in the exit 11, respectively. It will be appreciated, that this furnace or burner and its operation are described in detail in copending application Serial Number 814,700, filed May 21, 1959, now Patent No. 3,140,155.

Positioned within the inlet 14, in accordance with the present invention, is a mixer-nozzle means indicated generally in FIGURES 1 and 2 as 18. This mixer-nozzle has a steam inlet 19, an inlet 20 for the halogenated organic material, and an inlet 21 for air or steam. The mixer-nozzle is formed with an inner conduit portion 22 through which the mixture of steam and halogenated organic materials is introduced into the annular combustion chamber 10 of the furnace and an outer conduit means surrounding the inner means so as to form an annular conduit 23 around the inner conduit 22. The inlet 21 is in communication with this conduit 23. Suitable flanges are provided for securing the mixer-nozzle in the inlet 14 of the furnace.

As is shown in more detail in FIGURE 3, the mixer-nozzle apparatus 18 may be considered as having a mixing and atomizing portion 24 and a nozzle portion 25. The steam inlet 19 is in communication with the mixer and atomizing portion 24 of the apparatus. The mixer-atomizer portion 24 of the apparatus is formed with a first constricted zone 26 which is in communication with a first expanded zone 27. The inlet 20 for the halogenated organic material is positioned in this first expanded zone 27, wherein the intimate admixing of the halogenated orgainc material and the steam is effected. The first expanded zone 27 opens into a second constricted zone 28 through which the intimate admixture of halogenated organic material and the steam is effected. The first expanded zone 29. This second expanded zone 29 opens into the inner conduit 22, of the nozzle portion 25 of the apparatus.

Surrounding this inner conduit 22 is a second conduit 30, which conduit is spaced apart from the inner conduit 22 so as to form an annular space 23 around this inner conduit. The second conduit 30 is provided with a gas inlet 21, which inlet is in communication with the annular space 23 around the inner conduit 22. A flange 31 is provided, on the second conduit 30 for securing the entire apparatus within the inlet 14 of the furnace in a gas-tight relation.

It will be appreciated that in their most preferred embodiment, the constricted and expanded zones of the present apparatus are formed as two truncated cones joined at their smaller ends by a cylindrical section. Such a configuration is shown in FIGURE 3 of the drawings. This preferred configuration is, however, merely exemplary of those which can be used and is not to be taken as a limitation on the present invention.

In operation of the apparatus of the present invention, steam, under pressure, within the range of about 30 to about 70 pounds per square inch (gauge) is introduced into the inlet 19 of the mixing-nozzle apparatus 18. The steam passes through the first constricted zone 26 into the first expanded zone 27 of the mixer portion 24 of the apparatus. Within the first expanded zone, the expanding steam coming from the constricted zone 26 contacts the halogenated organic material introduced into the expanded zone 27 through the inlet 20. The force of the expansion of the steam into the expanded zone 27 effects an intimate admixture of the steam with the halogenated organic material within the expanded zone. From the expanded zone 27, the admixture of steam and halogenated organic material, still under pressure, passes through the second constricted zone 28 into the second expanded zone 29. The force created by the expansion of the mixture from the second constricted zone 28 into the second expanded zone 29 effects a substantially complete atomization of the steam-halogenated organic material mixture. This atomized mixture is passed through the inner conduit 22, from the second expanded zone 29, and is injected into the annular combustion chamber 10 of the furnace. Air, in an amount sufficient to provide for the oxygen requirement of the furnace is introduced into the inlet 21 in the second conduit 30 where it passes through the annular space 23 and forms a gaseous envelope around the atomized mixture as it is injected into the annular combustion zone 10.

The combustion zone 10 of the furnace is maintained at a suitable high temperature to effect combustion of the atomized mixture as it is injected into the furnace. Generally, this temperature will be within the range of about 900 to about 1300 degrees centigrade, although higher or lower temperatures may also be used, depending upon the temperature at which combustion of the halognated organic material takes place. The combustion product passes around the annular combustion chamber 10 under the force exerted on it by the tangentially injected reaction mixture and is drawn upwardly into the top space 12 and then down into the inner chamber 13 to the outlet 11, from which is withdrawn the final combustion product comprising carbon dioxide, and the hydrogen halide. This is shown clearly with reference to the flow arrows in FIGURES 1 and 2.

In actual operation, a furnace constructed in the manner shown in FIGURES 1 and 2, and having an inside volume of about 60 cubic feet, was preheated to a temperature of about 900 degrees centigrade. A halogenated organic material was then metered into the mixer-nozzle 18 through the inlet 20 at a rate of about 425 pounds per hour. This halogenated organic material was comprised of substantial quantities of the following materials: $CCl_4$, $C_2Cl_4$, $C_2Cl_6$, $C_4Cl_6$, $C_5Cl_8$, and $C_6Cl_6$. The overall average composition of this feed material was about 20 percent carbon and 80 percent chlorine. Steam, at the rate of about 300–500 pounds per hour and a pressure of about 70 pounds per square inch (gauge) was also added to the mixer-nozzle 18 through the inlet 19. Within the mixer portion 24 of the mixer-nozzle, the steam and halogenated organic material were intimately admixed and the mixture vaporized as it passed through the second constricted zone 28 into the second expanded zone 29 and into the inner conduit 22 of the nozzle portion 25 of the apparatus. Air, at the rate of about 660 pounds per hour, was also added to the combustion zone 10 of the furnace, a portion of this air being added to the inlet 21 in the second conduit 30 and the remainder being introduced through the bottom furnace inlet 15. Burning of the atomized mixture within the combustion chamber 10 of the furnace took place about 2 to 3 feet from the end of the nozzle, the burning being characterized by a bright flame. Additionally, it was noted that there was no fall-out from the atomized combustion mixture, i.e., no unburned or partially burned particles built up on the relatively cool lower portion of the combustion chamber 10. The exit gases from the outlet 11 were comprised of about 350 pounds per hour of hydrogen chloride, 311 pounds per hour of carbon dioxide, 507 pounds per hour of nitrogen, and balance excess steam and oxygen with traces of carbon monoxide. The exit gases contained no detectable free chlorine, carbon, or organics. The hydrogen chloride in this exit gas stream may then be recovered as a salable product by any known means, such as a hydrogen chloride absorption apparatus.

The above procedure was repeated using a modified mixer-nozzle apparatus. In this apparatus, the mixer portion 24 was replaced with a straight pipe into which steam and the halogenated organic materials could be introduced. Using this modified apparatus, a series of runs were made using different feed conditions. In the first of these runs, the halogenated organic material was pumped under pressure through the feed nozzle into the furnace, using no steam or air. In the second run, steam and the halogenated organic material were injected into the feed nozzle and in the third run, air was also introduced into the annular space 23 surrounding the conduit 22. In each of these runs, it was noted that the combustion of the feed material took place at an appreciably greater distance from the end of the feed nozzle and that the resulting flame was quite sluggish and dark yellow in color. Additionally, there was appreciable fall-out from the combustion mixture with a build up of unburned and partially burned materials in the cooler lower portions of the combustion chamber 10. This build up of residue in the combustion chamber was sufficiently great that it was necessary to shut down the reactor once every 8 hours to burn out the accumulated coke and tars. Shutdown times of up to 2 hours were required, during which the accumulated residue was burned out with fuel gas, in order to removed the accumulation.

It will be appreciated that although primary reference has been made hereinabove to the treatment of chlorinated organic materials, the process and apparatus of the present invention may be used in disposing of organic materials containing bromine, fluorine, or iodine substituents as well. In these instances, of course, the furnace will be constructed of materials which will withstand the feed materials used and their products of combustion.

While there have been described various embodiments of the invention, the methods and apparatus described are not intended to be understood as limiting the scope of the invention, as it is realized that changes therewithin are possible and it is further intended that each element recited in any of the following claims is to be understood as referring to all equivalent elements for accomplishing substantially the same results in substantially the same or equivalent manner, it being intended to cover the invention broadly in whatever form its principle may be utilized.

What is claimed is:

1. A method for converting halogenated organic materials into normally gaseous products comprising carbon dioxide and hydrogen halide, which comprises intimately admixing a halogenated organic material and a gaseous medium selected from the group consisting of gaseous oxygen sources and mixtures thereof, said oxygen sources being selected from the group consisting of steam, oxygen and air and said hydrogen sources being selected from the group consisting of hydrogen, hydrocarbon and steam passing the resulting mixture, under pressure, through a constricted zone into an expanded zone, effecting atomization of the mixture as it passes into the expanded zone, and introducing the resulting atomized mixture into a combustion zone with the amount of gaseous medium introduced into the combustion zone being at least that which is sufficient to convert the halogen content of the halogenated organic material to hydrogen halide and convert the carbon content of the halogenated organic material to carbon dioxide, the combustion zone being maintained at a temperature high enough to effect such conversions to obtain substantially complete combustion of the mixture to a product comprising carbon dioxide and a hydrogen halide and containing substantially no free halogen, free carbon and organic compounds.

2. The process as claimed in claim 1 wherein the atomized mixture is brought into contact with a second gaseous medium selected from the group consisting of gaseous oxygen sources and mixtures thereof, said oxygen sources being selected from the group consisting of steam, oxygen and air and said hydrogen sources being selected from the group consisting of hydrogen, hydrocarbon and steam as it is introduced into the combustion zone.

3. The method as claimed in claim 2 wherein steam is the gaseous medium admixed with the halogenated organic material and air is the gaseous medium with which the atomized mixture is contacted.

4. A method for converting halogenated organic materials into normally gaseous products comprising carbon dioxide and hydrogen halide which comprises passing a gaseous medium, under pressure, through a constricted zone into an expanded zone, said gaseous medium being selected from the group consisting of gaseous oxygen sources and mixtures thereof, said oxygen sources being selected from the group consisting of steam, oxygen and air and said hydrogen sources being selected from the group consisting of hydrogen, hydrocarbon and steam, introducing a halogenated organic material into the expanded zone, effecting an intimate admixture of the gaseous medium and the halogenated organic material within said expanded zone, passing the resulting mixture, under pressure, through a second constricted zone into a second expanded zone, effecting atomization of the mixture as it passes into the second expanded zone, and introducing the resulting atomized mixture into a combustion zone, the amount of gaseous medium introduced with the halogenated organic material being at least that which is sufficient to convert the halogen content of the halogenated organic material to hydrogen halide and convert the carbon content of the halogenated organic material to carbon dioxide, the combustion zone being maintained at a temperature of over about 900 degrees centigrade, high enough to effect substantially complete conversion of the mixture to a product comprising carbon dioxide and hydrogen halide, and containing substantially no free halogen, free carbon, and organic compounds.

5. The method as claimed in claim 4 wherein the atomized mixture is brought into contact with a second gaseous medium, selected from the group consisting of gaseous oxygen sources and mixtures thereof, said oxygen sources being selected from the group consisting of steam, oxygen and air and said hydrogen sources being selected from the group consisting of hydrogen, hydrocarbon and steam as it is introduced into the combustion zone.

6. The method as claimed in claim 5 wherein steam is the gaseous medium which is admixed with the halogenated organic material and air is the gaseous medium with which the atomized mixture is brought into contact.

7. A method for converting halogenated organic materials into normally gaseous products comprising carbon dioxide and hydrogen halide which comprises passing steam at a pressure within the range of about 30 to about 70 pounds per square inch (gauge) through a constricted zone into an expanded zone, introducing a halogenated organic material into said expanded zone, effecting an intimate admixture of the halogenated organic material and the steam within said expanded zone, passing the resulting mixture from the expanded zone through a second constricted zone into a second expanded zone, effecting atomization of the mixture as it passes into the second expanded zone, introducing the resulting atomized mixture into a combustion zone, enveloping the atomized mixture in air as it is introduced into the combustion zone, the amounts of steam and air being such as to convert the halogen of the halogenated organic material to hydrogen halide and the carbon of the halogenated organic material to hydrogen halide and the carbon of the halogenated organic material to carbon dioxide, and maintaining the combustion zone at a temperature in the range of about 900 degrees centigrade to about 1,300 degrees centigrade so as to effect substantially complete combustion of the mixtures, whereby a product is formed comprising carbon dioxide and hydrogen halide, and containing substantially no free halogen, free carbon and organic compounds.

References Cited by the Examiner

UNITED STATES PATENTS

| | | | |
|---|---|---|---|
| 1,874,692 | 8/1932 | Barstow et al. | 23–154 |
| 2,615,791 | 10/1952 | Raley | 23–154 |
| 3,097,073 | 7/1963 | Hildyard et al. | 23–277 |
| 3,140,155 | 7/1964 | Cull et al. | 23–277 |
| 3,220,798 | 11/1965 | Cull et al. | 23–155 |

OSCAR R. VERTIZ, *Primary Examiner.*

J. J. BROWN, *Assistant Examiner.*

UNITED STATES PATENT OFFICE
CERTIFICATE OF CORRECTION

Patent No. 3,305,309                          February 21, 1967

Richard G. Woodland et al.

It is hereby certified that error appears in the above numbered patent requiring correction and that the said Letters Patent should read as corrected below.

In Fig. 2 of the drawing, the tail from numeral 13 should extend to the column inside the inner wall cylinder as it does in Fig. 1. --; column 7, line 57, and column 8, lines 6, 22 and 4 after "sources", each occurrence, insert -- and gaseous hydrogen sources --; column 7, line 61, for "steam" read -- steam, --.

Signed and sealed this 24th day of September 1968.

(SEAL)
Attest:

Edward M. Fletcher, Jr.                          EDWARD J. BRENNER
Attesting Officer                                  Commissioner of Patents